Jan. 13, 1959
G. BIANCHI ET AL
2,868,561
MAGNETIC WRITING BOARD
Filed March 12, 1956
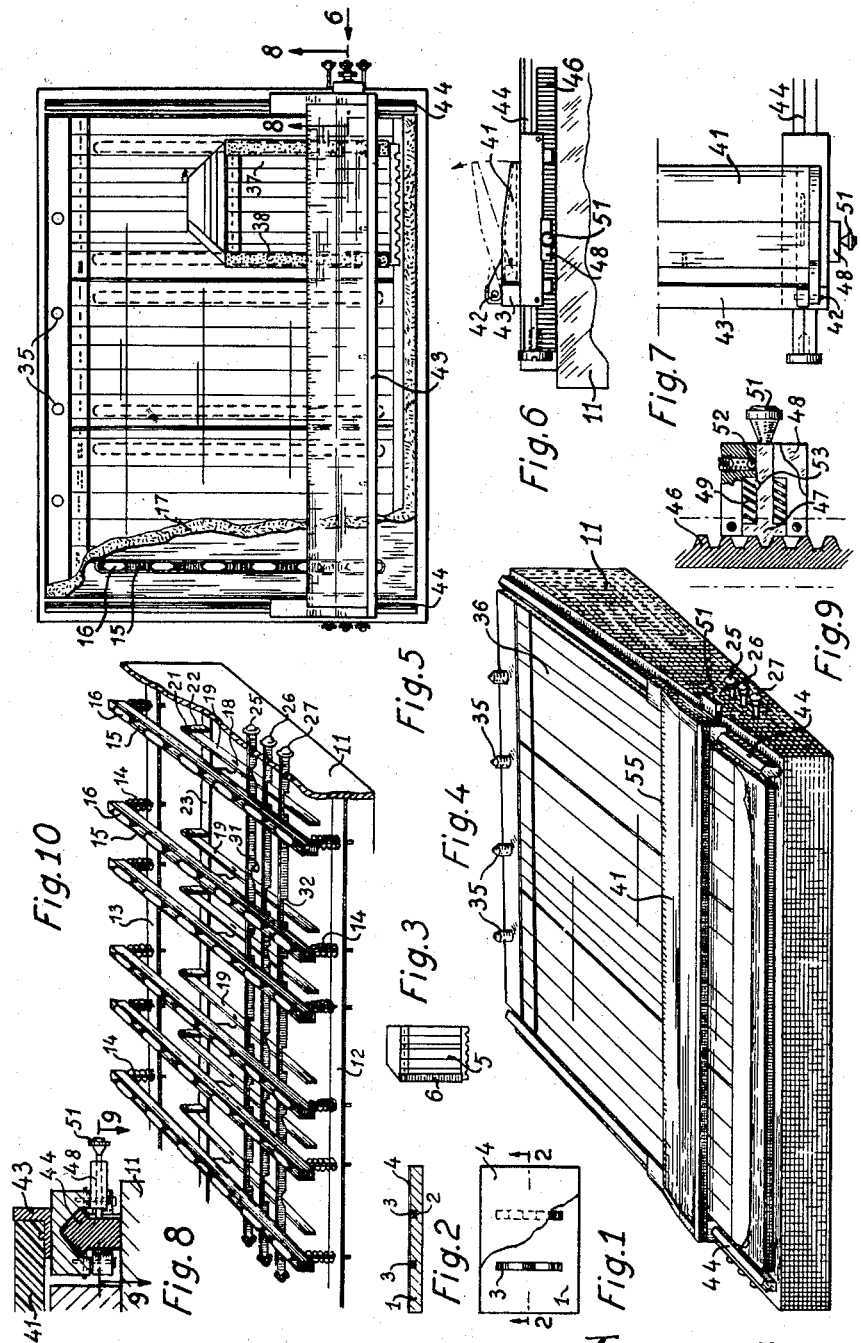
Inventors
G. Bianchi
J.-P. Rose
By Hancock Downing Hubbell
Attys.

United States Patent Office 2,868,561
Patented Jan. 13, 1959

2,868,561

MAGNETIC WRITING BOARD

Guiseppina Bianchi, Puteaux, and Jean-Paul Rose, Paris, France, assignors to Societe d'Etudes, de Gestion et d'Exploitation de Brevets, S. E. G. E. B., J. Branche & Cie, Paris, France, a French company Application March 12, 1956, Serial No. 570,861

Claims priority, application France March 17, 1955

4 Claims. (Cl. 282—29)

This invention relates to a writing board adapted to temporarily hold documents, e. g. for book-keeping purposes.

For such purposes, there has been previously proposed what is usually referred to as a "peg board," that is a backing support for one or more sheets provided along one or two of its edges with a number of pegs at regular intervals. The sheets for use with such a board are punched with holes spaced to correspond with the spacing of the pegs on the board.

A disadvantage of such arrangements lies in the fact that only sheets with a suitably positioned punching can be used with a given board. Moreover, they have the drawback of not affording selective attachment of the documents in several positions. Finally, perforated sheets are easily deteriorated especially those made of thin paper.

In other types of accounting boards, while the back sheet, such as a journal page, is perforated as described above and hooked on pegs extending along the upper edge of the board, the other documents to be superposed to the said sheet, for simultaneous recording of one or more entries, are clamped in a carriage displaceable at least vertically and, in certain types of accounting boards, also horizontally.

The main disadvantage of these arrangements is to require from the operator the use of her both hands. Moreover, if the operator is disturbed during her work, the documents may be inadvertently shifted.

An object of the invention is to provide a writing board on which documents may be held under the mere action of magnet elements embedded in the board.

This arrangement offers a number of advantages: it requires no previous perforation of the documents. The upper surface of the board may be kept perfectly smooth without any projecting part capable of deteriorating the documents. The operator keeps her both hands free once she has arranged her documents on the board. Documents of various size may be used on a same board and, once a document adheres magnetically to the board, there is no risk of disturbance as long as the action of the magnet elements is not interrupted.

Still a further advantage of the magnetic board according to the invention is that, when several documents are superposed, only the uppermost of them requires to be provided with magnetic parts which permits using any number of intermediate sheets of any nature and size having been subjected to no special preparation.

Another object of the invention is to provide a magnetic writing board of the type described, wherein the above mentioned embedded magnet elements are arranged in a given configuration, while the documents provided with magnetic parts are so designed that, once attracted by said magnet elements, they can only assume a limited number of relative positions on the board.

In one embodiment of the invention, the configuration of the magnets and that of the magnetic parts of the documents are so chosen that the documents may only assume one single position on the board. This may be used for example to design writing desks for children with sheets or copy-books equipped with magnetic parts, whereby said sheets or copy-books assume, so to speak, by themselves, a correct position on the desk which not only teaches the child how he must hold his copy-book, but also may incite him to learn to write by amusing him.

Nevertheless, the main application of the invention is to be found in accounting boards.

It is therefore a more particular object of the invention to provide a board of the type described having a size at least equal to that of an account book such as a journal, the above mentioned magnet elements being embedded in the board in vertical rows corresponding to the columns of such a book, while, at least those documents which are intended to lie over all other ones, during a book-keeping recording operation, are equipped with magnetic parts extending along at least one vertical edge thereof.

The back sheet on which the operations are to be recorded may be also held on the board under magnetic action. However, it is within the scope of the invention to ensure its securing by any other means such as the already mentioned known pegs.

With this arrangement, once a journal sheet or the like, has been attached to the board, with its columns in register with the above mentioned vertical rows of magnet elements, a document equipped as previously explained, together with a desired number of intermediate sheets may be magnetically held on the said journal sheet in any column thereof and at any vertical level along this column. Once a first entry has been made, the uppermost document may be slid along the same column for the next entry, etc.

Another object of the invention is to provide a magnetic board of the type described with means for selectively suppressing the action of one or more rows of magnet elements, which permits removing said documents from the board without exerting a considerable stripping effort thereon. This feature is particularly important in the case, when one or more of the documents used are made of thin paper, to avoid tearing.

While selectively energizable electro-magnets may be used in a magnetic writing board of the type described, without departing from the scope of the invention, the magnet elements are preferably of the permanent type and e. g. of the kind having a so-called "axial magnetization." This last feature permits designing a magnetic writing board according to the invention, capable of exerting considerable magnetic attraction on suitably equipped documents.

It is another object of the invention to mount such permanent magnets on retractable supports having an active position in which the magnetic parts of the documents may be brought within their fields and a retracted position, wherein the said parts are no more subjected to the action of said fields. In a constructive embodiment of the invention, the above mentioned retractable magnet supports are adapted to be selectively controlled from suitable hand levers.

The magnetic writing-board according to the invention may be completed by a transverse rule preferably provided with graduations and slidably mounted on two rails.

Such a rule, acting as a support for the hand of the operator, facilitates the writing and recording operations.

In a particular embodiment, the said rule is hinged on its supports so that it may be lifted to accommodate the documents to be laid on the table.

One of the above mentioned rails may be provided with a rack between the teeth of which may be engaged a lock solid with the rule, which permits holding the same stationary in any desired position along the rails.

Preferred embodiments of the invention will be hereinafter described with reference to the accompanying drawings given merely by way of example and in which:

Figure 1 is a top plane view with parts broken away of a magnetic writing-board according to the invention.

Figure 2 is a sectional view along line 2—2 of Figure 1.

Figure 3 shows a document adapted to be held on a magnetic writing board.

Figure 4 is a general perspective view of a magnetic accounting board according to the invention.

Figure 5 is a corresponding plane view with parts broken away.

Figure 6 is a partial elevational view taken in the direction of the arrow 6 of Figure 5.

Figure 7 is a top half-plane view corresponding to Figure 6.

Figure 8 is a partial sectional view along line 8—8 of Figure 5.

Figure 9 is a partial sectional view along line 9—9 of Figure 8 and

Figure 10 is a perspective view of a selecting mechanism for controlling a plurality of vertical rows of permanent magnets.

Referring first to Figures 1 and 2, there is shown at 1 a writing board provided with two grooves 2 wherein are embedded two vertical rows of permanent magnets 3 having their upper faces flush with that of the board. This assembly is coated with a thin protective sheet 4, e. g. made of a plastic material or a non-magnetic metal such as copper or the like.

On the other hand, documents, such as the card 5 shown in Figure 3 are provided with suitable elements made of magnetic material, such as iron or steel, e. g. in the shape of a thin strip 6 secured along one edge of said document. It will be easily understood that if a card such as 5 thus equipped is laid on the board 1, with its metal strip 6 in the vicinity of one of the magnet rows 3, the latter will attract the said metal strip, whereupon the card 5 will be held at any vertical level along either one of two vertical columns according to the row of magnets 3 selected.

It is obvious that the documents to be laid on the magnetic table could be also coated on their back with a suitable varnish containing magnetic metal powder.

It is also possible to incorporate magnetic powder in the paper during the manufacture of the same.

In Figure 1, two vertical rows 3 of magnets are provided to show how a card such as 5 may be selectively held on the board 1 in several locations. This advantage is particularly important in a writing board intended to be used for book-keeping purposes, as described hereunder.

Figure 4 shows an accounting board supported on a flat base 11, the upper side of which is slightly inclined for facilitating writing and recording operations.

The base 11 is hollow and its lateral flanges carry two outer longitudinal bars 12 and 13 (see Figure 10) on which are mounted, through compression springs 14, a number (six in the example shown) of channel lateral bars 15 parallel with each other and in each of which are embedded a plurality of permanent magnets 16. The bars 15 are urged upwardly into contact with the inner face of the table 17 by the springs 14, and they may be drawn downwardly, each by means of a hook 18 engaged in a suitable hole of a lateral rod 19, pivoted at 21 on a bracket 22 solid with an intermediate longitudinal bar 23, also secured on the side flanges of the base 11.

The rods 19 may be selectively actuated by pairs by means of longitudinal draw-rods 25, 26, 27 parallel with each other and slidably mounted in suitable holes provided in the side flanges of the base 11. The draw-rod 25 is provided with on its lower edge two cam-notches 31 adapted to cooperate with the upper edges of the right-hand pair of bars 19, so that, when the said rod 25 is brought into a position in which the notches 31 are located above the bars 19 of said pair, the latter may be held in their higher position under the action of the compression springs 14 of the corresponding magnet supporting bar 15. Conversely, when the draw-rod 25 is brought into a position in which the notches 31 are not above the bars 19 of said pair, the latter are pushed downwardly together with the associated magnet supporting bars 15, against the action of the relevant springs 14.

Each of the two other draw rods 26, 27, also offers two notches 31 having inclined faces and so arranged that the rod 26 be capable of actuating the mid pair of magnet supporting bars 15 and the rod 27 the left hand pair of such bars. Each one of the three draw-rods is furthermore provided with indentations 32 having parallel faces and the purpose of which is merely to accommodate the bars 19, it does not act upon to allow for their actuation by that of the other draw rod which is affected to this purpose.

In the example shown, there is provided, on the front face of the board, in the vicinity of its upper edge, a line of equally spaced pegs 35 on which may be engaged suitable perforations of a journal sheet or the like. However, any other means may be provided to secure such a sheet on the board and e. g. additional magnets also embedded in the board.

Figure 5 also shows a card 37, the two vertical edges of which are provided with a magnetic metal strip 38. The distance on the card between the said strip is equal to the distance between a pair of magnet supporting bars 15.

Now, if the location of the said magnet supporting bars corresponds to columns suitably drawn on the journal sheet 36, and if a carbon copying paper is interposed between the said sheet and the card 37 or, again, if the back face of the said card is coated with a conventional transfer layer, no particular attention will be required to record, in the suitable column of the journals sheets, data simultaneously written on the card 37. To remove a card from a column of the sheet, it suffices to actuate the corresponding draw-rod so as to retract the pair of magnet supporting bars 15. It is also possible before laying a card in a given column, to actuate both draw rods corresponding to the two other columns, so that only these magnets which register with the desired column are left operative.

The number and kinds of works to be effected on a board of this type are unlimited. Thus, it is also possible to write simultaneously on several superposed documents including a journal sheet or the like to obtain a common transfer of data, both between said documents and on the said sheet. To facilitate writing operations and, in particular, horizontal alignment, there is also provided, in the example shown, a longitudinally extending rule 41 (see also Figures 6 and 7), hinged on pins 42 secured on a carriage 43, slidably mounted on two rails 44 (see also Figure 8) having polygonal cross-sections.

The two rails 44 are secured on the base 11 and one of them supports a rack 46 (see also Figure 9), between the teeth of which may be engaged a lock 47 slidably mounted on a support 48, rigid with the carriage 43. The said lock is urged elastically towards the rack 46 by a compression spring 49; a knob 51 permits releasing the lock 47 from the teeth of the rack 46, and a yielding locating device 52, e. g. constituted by a ball pushed by a spring and adapted to engage a notch 53 of the lock 47, permits temporary holding the lock 47 in retracted position.

Preferably, the rule 41 is made of a transparent material and bears, at least along its upper edge, suitable graduations and/or marks, e. g. corresponding to the columns of the journal sheet.

It is to be understood that such a rule facilitates the alignment of the written data while constituting a support for the hand of the operator, which avoids the use of a writing-pad. The said rule may be easily displaced along the rack upon retraction of the lock 47 or, on the contrary, locked in any point of its stroke upon engagement of the said lock between the teeth of said rack. Moreover, to facilitate the laying and removal of the documents, it is possible to lift the rule 41 by pivoting the same around its hinges 42 in the direction of the arrow (see Figure 6) to bring it, for example, into the position shown in dot-dash line.

What is claimed is:

1. A magnetic writing support for retaining a sheet of writing paper having magnetizable material associated therewith, comprising a rectangular casing having long and short sides, said casing having a rectangular top plate of non-magnetic material serving for backing said sheet, a plurality of elongated members arranged in the casing to extend generally in parallel relationship to the short sides of the casing and each member including a plurality of longitudinally spaced permanent magnets, means mounting said elongated members in the casing for substantially vertical movement relative to the top plate between a position in which the said members are in abutting contact with the lower face of the top plate to retain the magneized material of the sheet in contact with the upper face of the top plate by magnetic attraction and a position in which the members are spaced from the lower face of the top plate to decrease considerably the degree of magnetic attraction, and means operatively associated with said elongated members for moving said members from one of said positions to the other.

2. A magnetic writing support for retaining a sheet of writing paper having magnetizable material associated therewith, comprising a rectangular casing having long and short sides, said casing having a rectangular top plate of non-magnetic material serving for backing said sheet, a plurality of elongated members, with each member including a plurality of longitudinally spaced permanent magnets, a bar extending along each long side of the casing below the top plate, said elongated members being arranged within the casing to extend generally in parallel relationship to the short sides of the casing, said bars being below said elongated members, spring means operatively connected to each end of each of the elongated members and each of said bars to urge the elongated members upwardly into abutting relation with the lower face of the top plate to retain the magnetizable material of the sheet in contact with the upper face of the top plate by magnetic attraction, and means connected with and operable exteriorly of said elongated members and casing to move said elongated members downwardly against the action of the spring means to move said members away from the lower face of the top plate to decrease materially the degree of magnetic attraction.

3. A magnetic writing support for retaining a sheet of writing paper having magnetizable material associated therewith, comprising a rectangular casing having long and short sides, said casing having a rectangular top plate of non-magnetic material serving for backing said sheet, a plurality of elongated members, with each member including a plurality of longitudinally spaced permanent magnets, a bar extending along each long side of the casing below the top plate, said elongated members being arranged within the casing to extend generally in parallel relationship to the short sides of the casing, said bars being below said elongated members, spring means operatively connected to each end of each of the elongated members and each of said bars to urge the elongated members upwardly into abutting relation with the lower face of the top plate to retain the magnetizable material of the sheet in contact with the upper face of the top plate by magnetic attraction, further bar means within the casing intermediate said bars and extending parallel to said bars, a rod pivoted to each bar means and arranged in parallelism to each elongated member, means connecting each elongated member to each rod, and means slidable longitudinally of the casing and operatively associated with said rods to move the rods downwardly together with the elongated members against the action of the spring means to move said members away from the lower face of the top plate to decrease materially the degree of magnetic attraction.

4. A writing support as claimed in claim 3 wherein the slidable means is defined by a draw bar movable in apertures in the short sides of the casing and at least one cam notch in the draw bar cooperable with the rod to allow the rod to move upwardly with the elongated member under the action of the spring means.

References Cited in the file of this patent

UNITED STATES PATENTS

| | | |
|---|---|---|
| 2,497,332 | Teetor | Feb. 14, 1950 |
| 2,664,302 | Griffin | Dec. 29, 1953 |

FOREIGN PATENTS

| | | |
|---|---|---|
| 701,658 | Germany | Jan. 21, 1941 |
| 631,466 | Great Britain | Nov. 3, 1949 |